United States Patent [19]

Sakamoto

[11] Patent Number: 4,921,359

[45] Date of Patent: May 1, 1990

[54] SLIDE RAIL ASSEMBLY

[75] Inventor: Kazuhiko Sakamoto, Tokyo, Japan

[73] Assignee: Sugatsune Industrial Co., Ltd., Tokyo, Japan

[21] Appl. No.: 365,570

[22] Filed: Jun. 14, 1989

[51] Int. Cl.$^5$ ............................................. F16C 29/04
[52] U.S. Cl. ..................................... 384/18; 312/341.1
[58] Field of Search ....................... 384/18, 19, 17, 49, 384/54; 312/341 R

[56] References Cited

U.S. PATENT DOCUMENTS

| | | | |
|---|---|---|---|
| 2,606,090 | 8/1952 | Straubel | 384/18 |
| 3,912,341 | 10/1975 | Stein | 384/18 |
| 4,194,793 | 3/1980 | Offermans | 384/18 |
| 4,779,999 | 10/1988 | Lautenschläger | 384/19 |

Primary Examiner—Lenard A. Footland
Attorney, Agent, or Firm—Fleit, Jacobson, Cohn, Price, Holman & Stern

[57] ABSTRACT

There is provided a slide rail assembly, comprising an elongated inner rail and similarly elongated outer rail each having a U-shaped section and a pair of rounded lateral edge portions arranged vis-a-vis with the corresponding respective lateral edge portions of the other rail as well as a plurality of revolving bodies held between the juxtaposed rounded edge portions of the inner and outer rails, wherein the inside of said juxtaposed rounded lateral edge portions have a radius of curvature which is identical with that of the revolving objects so that the latter are arranged freely revolvably between the juxtaposed lateral edge portions with an appropriate space provided between any two neighboring revolving objects and each of the inner and the outer rails further comprises an intermediate rounded grooves running along the longitudinal axis of the rail to hold a number of intermediate revolving objects between the pair of intermediate rounded grooves, the inside of said rounded grooves and said intermediate revolving objects having an identical radius of curvature and said intermediate revolving objects being arranged in such a manner that an appropriate space is provided between any two neighboring objects and hence freely revolve. Such a slide rail assembly can be effectively used to eliminate any undesirable variances of the distance between the inner and outer rails.

5 Claims, 6 Drawing Sheets

SLIDE RAIL ASSEMBLY

BACKGROUND OF THE INVENTION

1. Field of the Invention

This invention relates to a slide rail assembly suitably used to realize a slidable drawer of a cabinet.

2. Prior Art

As illustrated in FIGS. 8 and 9 of the accompanying drawings, a conventional slide rail assembly typically comprises an inner rail a and an outer rail b, having a U-shaped section and lateral rounded edge portions a' and b', a plurality of balls, roller or other revolving objects c . . . being revolvably and serially retained between the pair of juxtaposed rounded edge portions a', b'.

Such a conventional slide rail assembly is normally used by rigidly fitting members d, e respectively to the inner rail a and the outer rail b so that said members become slidable relative to each other. However, a conventional slide rail assembly having a structure as described above is accompanied by certain drawbacks. When such a slide rail assembly is horizontally placed for use in a state as shown in FIG. 8 or under the condition where the rail assembly is placed horizontally but up side down relative to the state shown in FIG. 8, the weight of the fitted member d, and that of the member e are respectively directed in the directions as indicated by arrows f and g. When the weight are so directed, the slide rail assembly can be subjected to a very large load which in turn can cause slipping actions of the inner or outer rail and the revolving objects c . . . or particularly when the assembly is used for a drawer and the distance between the center of the revolving objects c . . . and the inner rail or the outer rail can become uneven, a phenomenon that can bring forth disagreement between the displaced distance of the inner rail a and that of the outer rail b for a drawing action of the drawer and result in unsmooth motion of the drawer.

When a conventional slide rail assembly is to be applied to a side wall of a drawer of a cabinet as illustrated in FIG. 9, the inner rail a is fitted to a member d such as a side wall of the drawer while the outer rail b is fitted to a member e such as a side wall of the encasing cabinet. Since the main body of the inner rail a and that of the outer rail are realized in the form of a plate and the inner rail a and the outer rail b respectively come to a close contact with the members d and e, any vibrating action of the revolving bodies c . . . retained between the inner and outer rails a, b is directly transmitted to the drawer and hence the cabinet and, when the they are made of steel, the vibration can be resonated by them to generate large noises.

3. Problems to be Solved by the Invention

It is therefore an object (the first object) of the present invention, in view of the above described problems, to provide a slide rail assembly comprising not only an inner rail and an outer rail as well as a plurality of revolving objects held between the rounded lateral edges of the rails, wherein the revolving objects and the inner surface of the lateral edges of the the inner and outer rails have an identical radius of curvature, but also one or more than one intermediate revolving object as well as a pair of intermediate revolving objects holding rounded sections provided between the lateral edge portion and on the inside respectively of the inner and outer rails and having a radius of curvature of their inner surfaces identical with that of the revolving objects to be retained therebetween and of the inner surface of the other revolving object retaining portions in order to ensure smooth sliding motion of the assembly and large load bearing capability with a relatively simple construction of the assembly, regardless of the slide rail assembly being used vertically or horizontally.

Another object (the second object) of the invention is to provide a slide rail assembly which is similar to an assembly as described above but has one or more intermediate revolving objects having a radius of curvature which is greater than that of the other revolving objects in order to reduce the speed of revolution of the intermediate revolving objects as compared with that of the other revolving object in order to reduce of wear and hence enhance the durability of the assembly.

Still another object (the third object) of the invention is to provide a slide rail assembly is similar to an assembly as described above whose revolving object holding rounded edge portions squarely face the main bodies of the inner and outer rails so that both the intermediate revolving object holding rounded portions and the revolving object holding edge portions of the inner and outer rails face the direction perpendicular to the main bodies of the inner and outer rails. With such a construction of the slide rail assembly, it becomes highly resistive to a force that tends to pull apart the inner and outer rails in the direction perpendicular to the rail main bodies as well as to a force that tends to push together the inner and outer rails in that direction and hence can ensure smooth sliding motion of the rails.

It is still another object (the fourth object) of the present invention to provide a slide rail assembly which is similar to the one described in reference to the second object but further comprises indentations on both the outer surface of the inner rail and that of the outer rail to form longitudinal grooves in order not only to enhance the strength of the rails but also to provide spaces between the inner and outer rails and the members rigidly fitted thereto with a view to reduce any possible transmission of noises generated by the revolving bodies to the fitted members such as the side wall of a drawer and that of the encasing cabinet.

A further object (the fifth object) of the invention is to provide a slide rail assembly which is identical with the one described in reference to the fourth object but the spaces formed between the inner and outer rails and the members fitted thereto can be filled with rubber packing and other noise-absorbing materials to enhance the noise-absorbing effect of the spaces and to improve the connection between the rails and the fitted members and hence the rigidity of the assembly.

SUMMARY OF THE INVENTION

The first object of the invention is achieved by providing a slide rail assembly comprising an elongated inner rail and a similarly elongated outer rail, each having a U-shaped section and a pair of rounded lateral edge portions arranged vis-a-vis with the corresponding respective lateral edge portions of the other rail as well as a plurality of revolving bodies held between the juxtaposed rounded edge portions of the inner and outer rails, wherein the inside of said juxtaposed lateral edge portions have a radius of curvature which is identical with that of the revolving objects so that the latter are arranged freely revolvably between the juxtaposed lateral edge portions with an appropriate space provided between any two neighboring revolving objects and each of the inner and the outer rails further comprises an intermediate rounded grooves running along the longitudinal axis of the rail to hold a number of intermediate revolving objects between the pair of intermediate rounded grooves, the inside of said rounded grooves, said intermediate revolving objects having an identical radius of curvature, said intermediate revolving objects being arranged in such a manner that an appropriate space is provided between any two neighboring objects and hence freely revolve.

The second object of the invention is achieved by providing a slide rail assembly which is similar to an assembly described in reference to the first object but comprises intermediate revolving objects whose radius of curvature is larger than that of the lateral revolving objects.

The third object of the invention is achieved by providing a slide rail assembly which is similar to an assembly described in reference to the second object but comprises lateral rounded edge portions for holding revolving objects which face the direction perpendicular to the main bodies of the inner and outer rails and consequently the same direction as the intermediate revolving object holding rounded grooves.

The fourth object of the invention is achieved by providing a slide rail assembly which is similar to an assembly described in reference to the second object but further comprises indentations provided on the outer surfaces of the inner and outer rails to form longitudinal wide grooves and hence realize spaces between the inner and outer rails and the members fitted thereto.

The fifth object of the invention is achieved by providing a slide rail assembly which is identical to an assembly described in reference to the fourth object but the spaces are filled with a packing material such as rubber.

BRIEF DESCRIPTION OF THE DRAWINGS

Now the invention will be described in greater detail by referring to the accompanying drawings which illustrate preferred embodiments of the invention. Of the drawings.

DETAILED DESCRIPTION OF THE INVENTION

Figure 1:
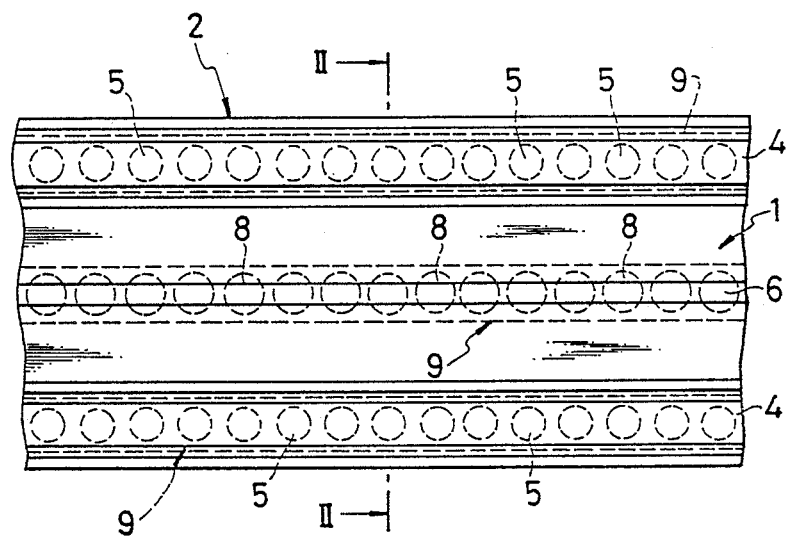
FIG. 1 is a front view of an embodiment of the slide rail assembly according to the invention.

Referring to FIGS. 1 through 4 which illustrate preferred embodiments of the invention, a slide rail assembly according to the invention comprises an elongated inner rail 1 and a similarly elongated outer rail 2, of which the inner rail 1 is laterally so dimensioned that it is appropriately embraced by the outer rail 2. The lateral edges of the inner and outer rail 1, 2 are provided with their respective pairs of rounded edge portions 3, 3 and 4, 4 so that the juxtaposed edges can hold revolving objects therebetween.

Said rounded edge portions 3, 3 and 4, 4 run along the longitudinal axis of the inner and outer rails to form axial grooves and the inner surfaces 3a, 3a and 4a, 4a of these grooves have a radius of curvature which is identical with that of each of a plurality of revolving objects 5 . . . such as balls or rollers. The revolving objects 5 . . . in each of the grooves are arranged in a straight line with appropriate spaces therebetween which separate them one another and retained between the juxtaposed edge portions 3, 4 so that the inner and outer rails 1, 2 are axially slidable relative to each other.

The embodiment also comprises an axial intermediate revolving object holding rounded portion 6 provided at the middle of the inner rail 1 and its counterpart 7 provided at the middle of the outer rail 2, inside of which form rounded axial grooves 6a, 7a between which a plurality of intermediate revolving objects 8 . . . are revolvably held between the inner rail 1 and the outer rail 2 in a straight line with spaces that appropriately separate the revolving bodies from one another.

Figure 2:
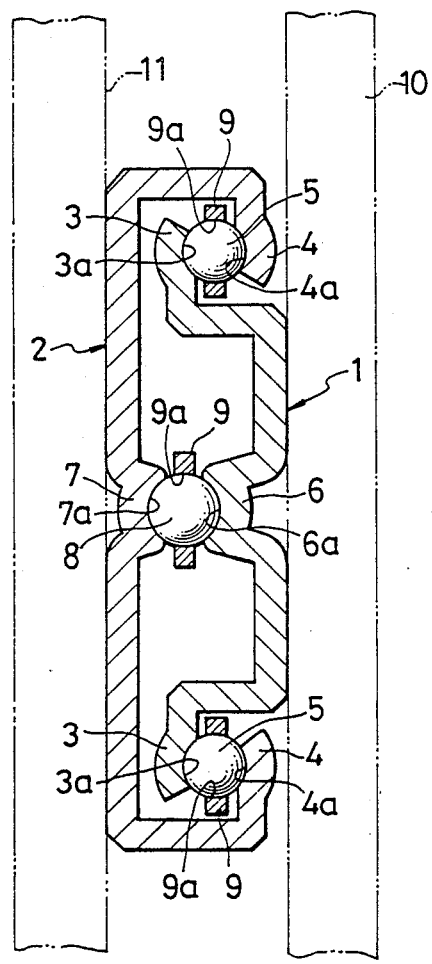
FIG. 2 is an enlarged lateral sectional view of the embodiment of FIG. 1 cut along II—II line.
Figure 3:
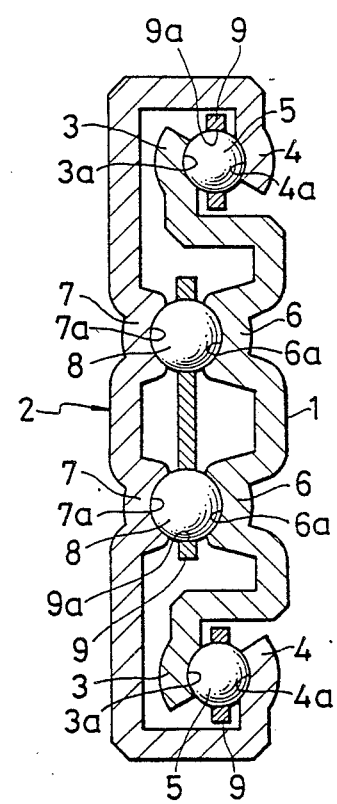
FIGS. 3 and 4 are enlarged lateral sectional views of two different embodiments of the invention.
Figure 4:
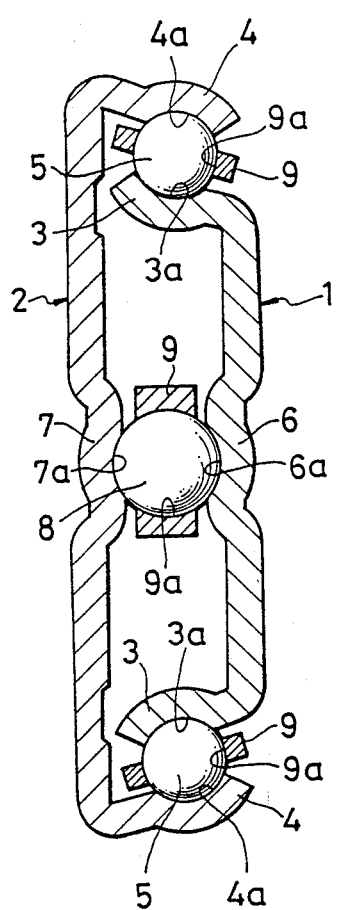

While the embodiments shown in FIGS. 1, 2 and 4 comprises intermediate revolving objects 8 . . . arranged in one straight line, they can be arranged in two or more than two straight lines as in the case of the embodiment illustrated in FIG. 3.

When the intermediate revolving objects 8 . . . form a single straight line, they are preferably arranged on a line that runs axially along the center line of the inner and outer rails 1, 2. When the intermediate revolving objects 8 . . . form two or more than two lines, they are preferably arranged in so many parallel lines which are spaced apart from one another in a manner as illustrated in FIG. 3.

It should be noted that each of the embodiments shown in FIGS. 2 and 3 has rounded grooves 3a, 3a and 4a, 4a of the respective rounded edge portions 3, 3, and 4, 4 designed to receive revolving objects 5 . . . facing squarely the direction perpendicular to the main portions of the inner and outer rails 1, 2 or the direction parallel to the facing line of the rounded grooves 6a, 7a of the intermediate rounded portions 6, 7 holding the intermediate revolving objects 8 . . . . With such an arrangement, the slide rail assembly can effectively resist any force applied to push together the inner and outer rails 1, 2 by means of the intermediate revolving objects 8 . . . and any force applied to pull apart the inner and outer rails 1, 2 by means of the revolving objects 5 . . . .

The revolving objects 5 . . . in the grooves of the lateral rounded portions as well as the intermediate revolving objects 8 . . . in the grooves of the intermediate rounded portions can be held apart with an identical space provided between any neighboring objects in a same line by means of holder plates 9 provided with holding bores 9a . . . into which the revolving objects 5 . . . and 8 . . . are appropriately inserted. This is a technique which is well known and popularly used for holding radial or slide ball bearings.

Said rounded edge portions 3, 4 may be so formed that, as illustrated in FIGS. 2 and 3, they stand upward in the direction perpendicular to the main portions of the inner and outer rails 1, 2 and the rounded grooves face downward However, they may be so formed that, as shown in FIG. 4, they face the direction perpendicular to the lateral edges of the inner and outer rails 1, 2.

The outer and inner rails 1, 2 may take a form that suits the members 10, 11 respectively to be fitted to the rails as best seen in FIG. 2.

Figure 5:
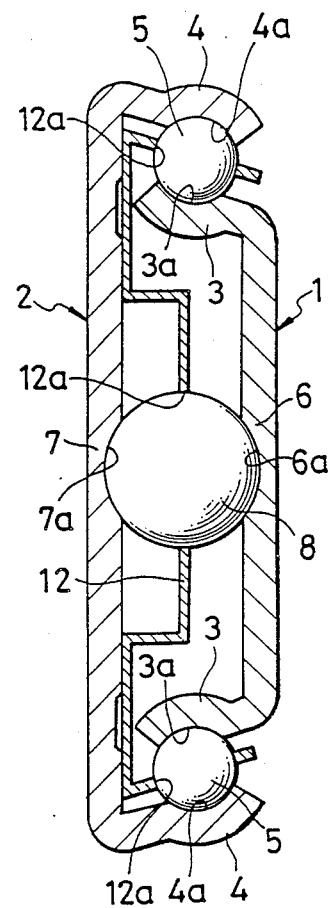
FIG. 5 is an enlarged lateral sectional view of a different embodiment of the invention.

The embodiment illustrated in FIG. 5 differs from those in FIGS. 1 through 5 in that, while each of the latter has the revolving object holding portions 6, 7 lifted upward from the inner surface of the inner rail 1 and that of the outer rail 2, the former has the revolving object holding portions 6, 7 on the same level as that of the inner rail 1 and and outer rail 2 and that the intermediate revolving objects 8 . . . are significantly larger than the other revolving objects 5 . . . . The embodiment of FIG. 5 uses holding frames 12, each of which comprise a number of bores 12a . . . for holding revolving objects 5 . . . and intermediate revolving objects as means for separating apart with identical spaces the revolving objects 5 . . . and 8 . . . arranged in same lines which are different from those of the embodiments of FIGS. 1 through 4. More specifically, the embodiment of FIG. 5 comprises holder frames 12 provided with bores 12 . . . arranged with even spaces therebetween into which the revolving objects 5 . . . and the intermediate revolving objects 8 . . . come to a revolvable engagement.

Figure 6:
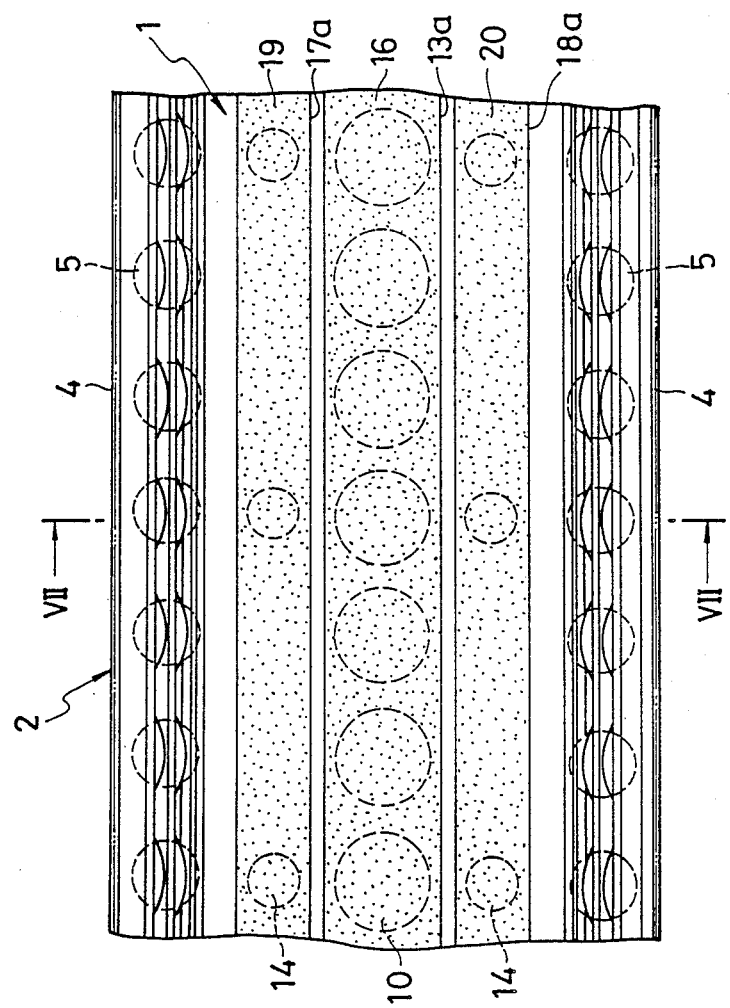
FIG. 6 is a plan view illustrating a different embodiment of the slide rail assembly according to the invention.
Figure 7:
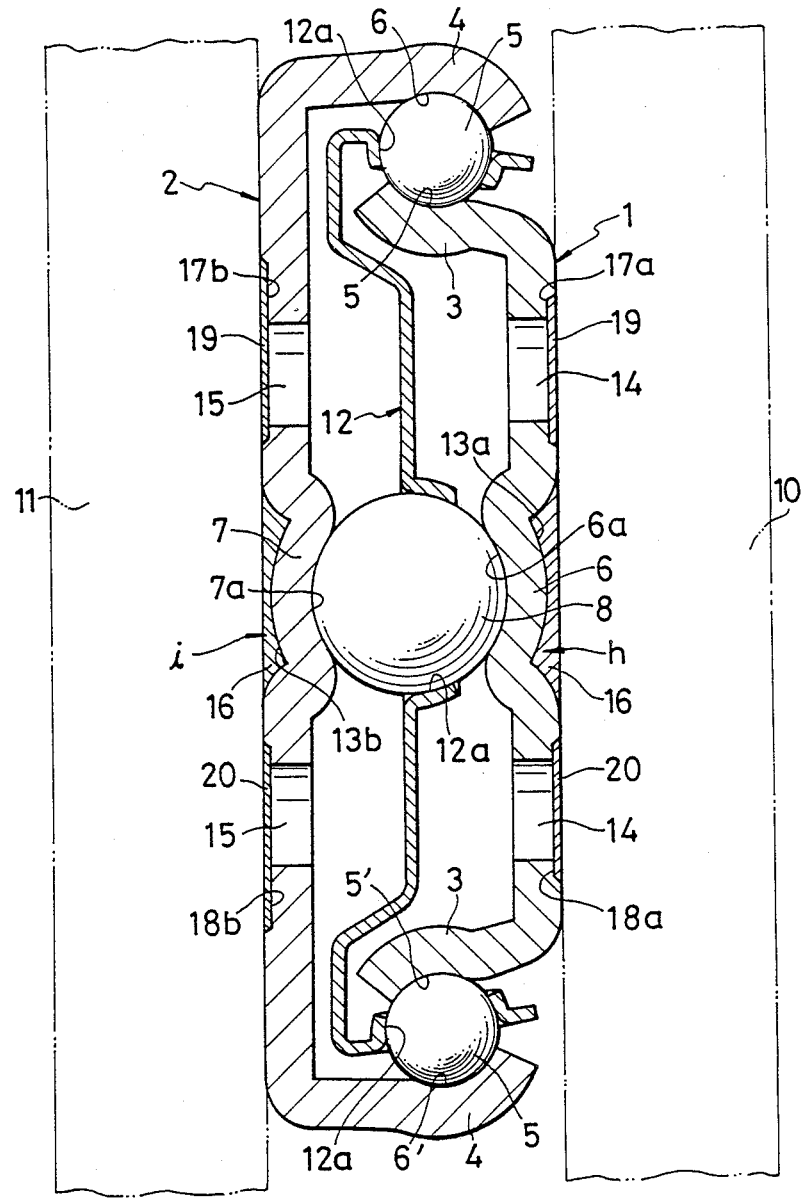
FIG. 7 is an enlarged lateral sectional view of the embodiment of FIG. 6 cut along IV—IV line.
Figure 8:
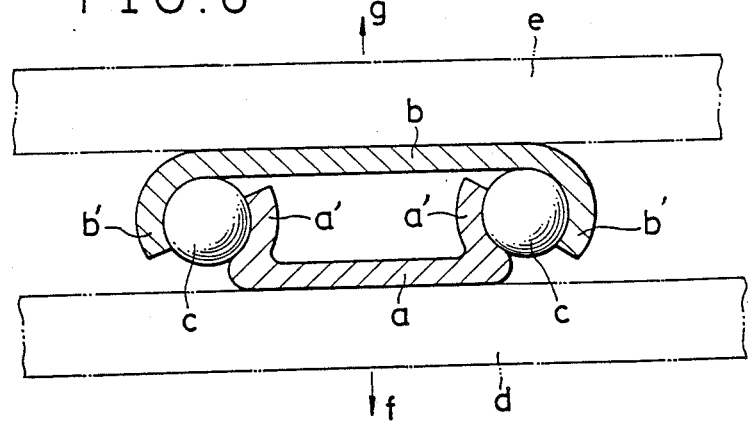
FIGS. 8 and 9 are enlarged lateral sectional views illustrating two different aspects of a slide rail assembly of prior art.
Figure 9:
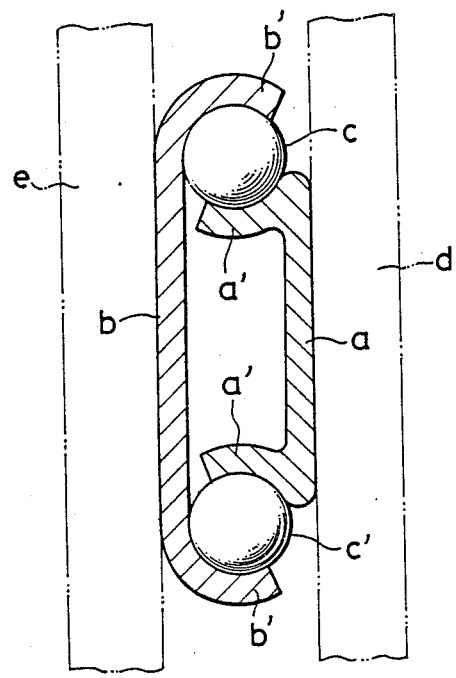

The embodiments illustrated in FIGS. 6 and 7 comprises, as in the case of the embodiments shown in FIGS. 1 through 4, a longitudinal groove 13a on the outer surface of the inner rail 1 and one outer groove 13b on the outer surface of the outer rail 2 running respectively at locations opposite to the revolving object-holding portions 6, 7 or along the axial center lines of the inner and outer rails 1, 2 and parallel to the grooves 67, 7a.

When a slide rail assembly as described above is fitted to a drawer and a encasing cabinet to realize a slidable drawer, the inner rail 1 and the outer rail 2 are respectively fitted to a side wall 11 of a drawer and a corresponding side 12 wall of a cabinet by means of fitting bores 14 . . . and 15 . . . respectively provided on the inner and outer rails and screws not shown. Then, spaces h, i are formed respectively between the intermediate revolving object-holding portion 6 of the inner rail 1 and the fitted member 10 and the intermediate revolving object-holding portion 7 of the outer rail 2 and the fitted member 11.

The grooves 6, 7 on the inner surfaces of the inner and outer rails 1, 2 and the grooves 13a, 13b on the outer surfaces of the inner and outer rails 1, 2 of the embodiment of FIGS. 6 and 7 are formed by a press machine in one pressing operation into rounded grooves, of which the rounded grooves 13a, 13b have a convex sectional view projecting outward.

However, the grooves 13a, 13b may be formed respectively along the longitudinal center lines of the inner and outer rails 1, 2 by notching the outer surfaces of the rails. While the embodiment comprises only one outer groove 13a of the inner rail 1 and one outer groove 13b of the outer rail 2, two or more than two outer grooves 13a or 13b running in parallel and spaced evenly apart may be formed on each of the inner and outer rails depending on the number of lines of the intermediate revolving objects.

It may be seen that the grooves 13a, 13b of the embodiment of FIGS. 6 and 7 are filled with a packing material such as rubber.

It should be noted that the embodiment of FIGS. 6 and 7 further comprises outer longitudinal grooves 17a, 17b, 18a, 18b formed along the longitudinal axis of the inner and outer rails 1, 2 and between said grooves 13a, 13b and the lateral edges or where the fitting bores 14 . . . , 15 . . . are formed. Said grooves 17a, 17b, 18a, 18b may be filled with packing members 19, 20 made of an elastic material such as rubber.

The grooves 17a, 17b, 18a, 18b as well as the packing members 19, 20 filled in the grooves can effectively improve the fitness of the combination of the inner and outer rails 1, 2 and the members of a drawer and a encasing cabinet respectively fitted thereto and reduce the noises generated by revolution of the revolving objects 5 . . . and the intermediate revolving objects 8 . . . .

EFFECTS OF THE INVENTION

A slide rail assembly according to the invention and have a construction as described above and designed to achieve the first object of the invention, wherein not only the revolving objects 5... retained between the juxtaposed rounded grooves 3a, 3a, 4a, 4a of the rounded edge portions 3, 3, 4, 4 of the inner and outer rails but also the intermediate revolving objects 8 . . . retained between the rounded grooves 6a, 7a of the revolving object holding portions 6, 7 are provided, can be suitably used to form a slidable drawer by placing the assembly either horizontally or vertically, because of the existence of the intermediate revolving objects 8 . . . that significantly improve the load bearing capability of the assembly and of the flexibility with which the configuration of the rounded edge portions of the inner and outer rails 1, 2 for holding the revolving objects can be modified to suit the members of a drawer and an encasing cabinet to be fitted thereto. Moreover, such a slide rail assembly can keep the distance between the inner and outer rails 1, 2 to a constant value and correct any variance of the distance to effectively prevent any tilted condition of the drawer that can be produced when there is discrepancy of the distance between the inner and outer rails 1, 2.

A slide rail assembly designed to achieve the second object of the invention can enhance its durability, because it comprises intermediate revolving objects 8 . . . which have a diameter significantly larger than that of the revolving objects 5 . . . located along the lateral edges of the rails and hence less subject to wear.

A slide rail assembly designed to achieve the third object of the invention, wherein the rounded grooves 3a, 3a, 4a, 4a of the rounded edge portions 3, 3, 4, 4 and the rounded grooves 6a, 7a of the revolving object holding portions 6, 7 are facing the direction perpendicular to the main portions of the rails, can effectively maintain an even distance between the rails to ensure smooth motion of the assembly even if the slide rail assembly, is subjected to an external force, because any force tending to pull apart the rails is borne by the lateral revolving objects 5 . . . , while a force tending to push the rails together is borne by the intermediate revolving objects 8 . . . .

A slide rail assembly designed to achieve the fourth object of the invention, wherein grooves 13a, 13b are formed on the outside of the revolving object-holding portions 6, 7 for the intermediate revolving objects 8 . . . and hence spaces h, i are formed between the areas where said revolving object-holding portions 6, 7 for the intermediate revolving objects 8 . . . of the inner and outer rails 1, 2 and the members 11, 12 fitted to the rails, can effectively prevent transmission of noises generated particularly by the intermediate revolving objects 8 . . . and hence possesses a noise-absorbing effect to ensure quiet sliding operation of a drawer.

Finally, a slide rail assembly designed to achieve the fifth object of the invention, wherein said grooves 13a, 13b are filled with packing members 16, 16, can effectively absorb noises generated by the revolving objects 5 . . . and the intermediate revolving objects 8 . . . , because of the noise-absorbing effect of the packing members 16, 16 and enhance fitness of the rails 1, 2 and the members 10, 11 fitted thereto to ensure rigid connection therebetween.

What is claimed is;

1. A slide rail assembly, comprising an elongated inner rail and a similarly elongated outer rail each having a U-shaped section and a pair of rounded lateral edge portions arranged vis-a-vis with the corresponding respective lateral edge portions of the other rail as well as a plurality of revolving bodies held between the juxtaposed rounded edge portions of the inner and outer rails, wherein the inside of said juxtaposed rounded lateral edge portions have a radius of curvature which is identical with that of the revolving objects so that the latter are arranged freely revolvably between the juxtaposed lateral edge portions with an appropriate space provided between any two neighboring revolving objects and each of the inner and the outer rails further comprises intermediate rounded grooves running along the longitudinal axis of the rail to hold a number of intermediate revolving objects between the pair of intermediate rounded grooves, the inside of said rounded grooves and said intermediate revolving objects having an identical radius of curvature and said intermediate revolving objects being arranged in such a manner that an appropriate space is provided between any two neighboring objects and hence freely revolve.

2. A slide rail assembly, comprising an elongated inner rail and a similarly elongated outer rail each having a U-shaped section and a pair of rounded lateral edge portions arranged vis-a-vis with the corresponding respective lateral edge portions of the other rail as well as a plurality of revolving bodies held between the juxtaposed rounded edge portions of the inner and outer rails, wherein the inside of said juxtaposed rounded lateral edge portions have a radius of curvature which is identical with that of the revolving objects so that the latter are arranged freely revolvably between the juxtaposed lateral edge portions with an appropriate space provided between any two neighboring revolving objects and each of the inner and the outer rails further comprises intermediate rounded grooves running along the longitudinal axis of the rail to hold a number of intermediate revolving objects between the pair of intermediate rounded grooves, the inside of said intermediate rounded grooves and said intermediate revolving objects having an radius of curvature which is larger than that of the other revolving objects and said intermediate revolving objects being arranged in such a manner that an appropriate space is provided between any two neighboring objects and hence freely revolve.

3. A slide rail assembly, comprising an elongated inner rail and a similarly elongated outer rail each having a U-shaped section and a pair of rounded lateral edge portions arranged vis-a-vis with the corresponding respective lateral edge portions of the other rail as well as a plurality of revolving bodies held between the juxtaposed rounded edge portions of the inner and outer rails, wherein the inside of said juxtaposed rounded lateral edge portions have a radius of curvature which is identical with that of the revolving objects so that the latter are arranged freely revolvably between the juxtaposed lateral edge portions with an appropriate space provided between any two neighboring revolving objects and each of the inner and the outer rails further comprises an intermediate rounded grooves running along the longitudinal axis of the rail to hold a number of intermediate revolving objects between the pair of intermediate rounded grooves, the inside of said intermediate rounded grooves and said intermediate revolving objects having an radius of curvature which is larger than that of the other revolving objects, said rounded lateral edge grooves and said rounded intermediate grooved facing the said direction and said intermediate revolving objects being arranged in such a manner that an appropriate space is provided between any two neighboring objects and hence freely revolve.

4. A slide rail assembly, comprising an elongated inner rail and a similarly elongated outer rail each having a U-shaped section and a pair of rounded lateral edge portions arranged vis-a-vis with the corresponding respective lateral edge portions of the other rail as well as a plurality of revolving bodies held between the juxtaposed rounded edge portions of the inner and outer rails, wherein the inside of said juxtaposed rounded lateral edge portions have a radius of curvature which is identical with that of the revolving objects so that the latter are arranged freely revolvably between the juxtaposed lateral edge portions with an appropriate space provided between any two neighboring revolving objects and each of the inner and the outer rails further comprises intermediate rounded grooves running along the longitudinal axis of the rail to hold a number of intermediate revolving objects between the pair of intermediate rounded grooves, the inside of said intermediate rounded grooves and said intermediate revolving objects having an radius of curvature which is larger than that of the other revolving objects, said intermediate revolving objects being arranged in such a manner that an appropriate space is provided between any two neighboring objects and hence freely revolve and said inner and outer rails being further provided with longitudinal grooves on the respective outer surfaces so that spaces are formed between outer surfaces of the rails and the members fitted thereto.

5. A slide rail assembly according to claim 4, wherein said grooves provided on the outer surfaces of the inner and outer rails are filled with packing members made of an elastic material such as rubber.

* * * * *